United States Patent [19]

Smeller et al.

[11] Patent Number: 4,735,365
[45] Date of Patent: Apr. 5, 1988

[54] IRRIGATION BOOM ASSEMBLY

[75] Inventors: Donald W. Smeller, Irvine; Stephen H. Govero, Glendora; Mark R. McClaran, Orange, all of Calif.

[73] Assignee: Rain Bird Sprinkler Mfg. Corp., Glendora, Calif.

[21] Appl. No.: 80,256

[22] Filed: Jul. 27, 1987

Related U.S. Application Data

[63] Continuation of Ser. No. 925,308, Oct. 31, 1986, abandoned, which is a continuation of Ser. No. 738,373, May 28, 1985, abandoned.

[51] Int. Cl.$^4$ .............................................. B05B 3/00
[52] U.S. Cl. ................................. 239/735; 239/163; 239/164; 285/114; 285/330; 403/396; 403/398
[58] Field of Search ........ 239/163, 164, 159, 722–749; 285/114, 330; 403/395, 396, 397, 398, 399

[56] References Cited

U.S. PATENT DOCUMENTS

| | | | |
|---|---|---|---|
| 1,143,136 | 6/1915 | Relitz | 285/330 |
| 3,672,572 | 6/1972 | Delfs | 239/731 |
| 3,942,722 | 3/1976 | Ede | 239/724 |
| 4,090,528 | 5/1978 | Hegemann | 239/728 |
| 4,405,085 | 9/1983 | Meyer | 239/728 |
| 4,432,494 | 2/1984 | Hunter | 239/729 |
| 4,491,274 | 1/1985 | Noble | 239/734 |

FOREIGN PATENT DOCUMENTS

| | | | |
|---|---|---|---|
| 268309 | 9/1963 | Australia | 403/396 |
| 316248 | 10/1918 | Fed. Rep. of Germany | 239/728 |
| 2437025 | 2/1976 | Fed. Rep. of Germany | 239/600 |

*Primary Examiner*—Andres Kashnikow
*Assistant Examiner*—Michael J. Forman
*Attorney, Agent, or Firm*—Kelly, Bauersfeld & Lowry

[57] ABSTRACT

An improved irrigation boom assembly is provided for relatively rapid and easy mounting onto the main water distribution pipe of a traveling irrigation system, particularly such as a center pivot or linear travel system. The improved boom assembly includes a water supply drop pipe adapted for rapid and secure mounting onto the main distribution pipe by an improved clamp assembly and for receiving water from the distribution pipe via a flexible feed hose. The drop pipe has a manifold at its lower end designed for facilitated connection to a lightweight boom comprising a pair of elongated wing tubes cantilevered outwardly therefrom in opposite directions, wherein the wing tubes are each supported in an adjustably selected geometry by a respective pair of support cables anchored between the drop pipe and the wing tube and threaded through support struts mounted at spaced intervals along the wing tube spans. The outboard end of each wing tube includes an easily removable end fitting to permit periodic flushing. Irrigation spray heads are easily mounted onto the wing tube end fittings and further to the drop pipe manifold and at selected points along the wing tubes to provide the desired irrigation coverage. In addition, the wing tubes are adapted for facilitated attachment of guy wires near their outboard ends to control the spacing relative to wing tubes of an adjacent boom. Moreover, the wing tubes are adapted to stack in compact nested relation for facilitated shipping and/or storage.

32 Claims, 6 Drawing Sheets

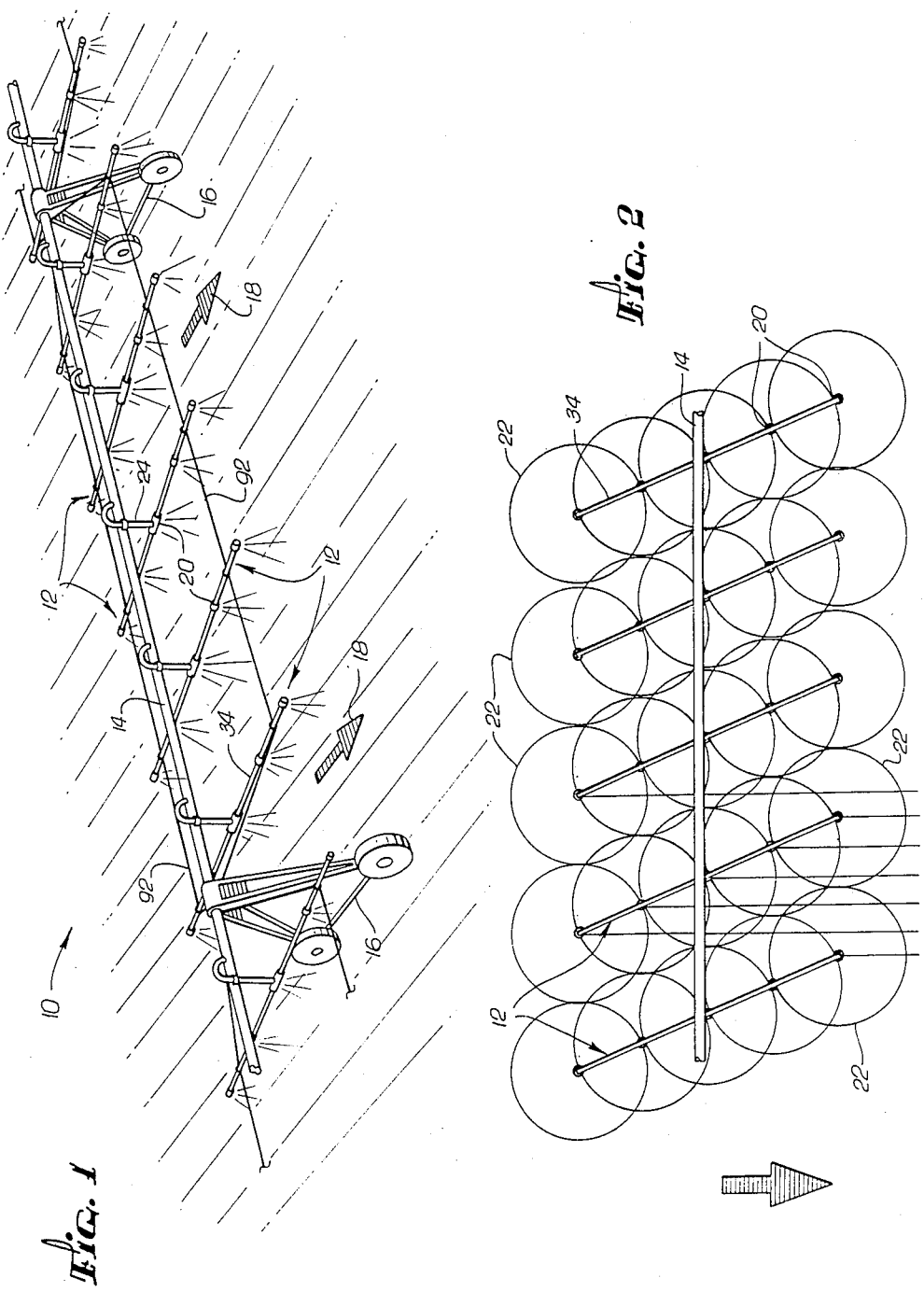

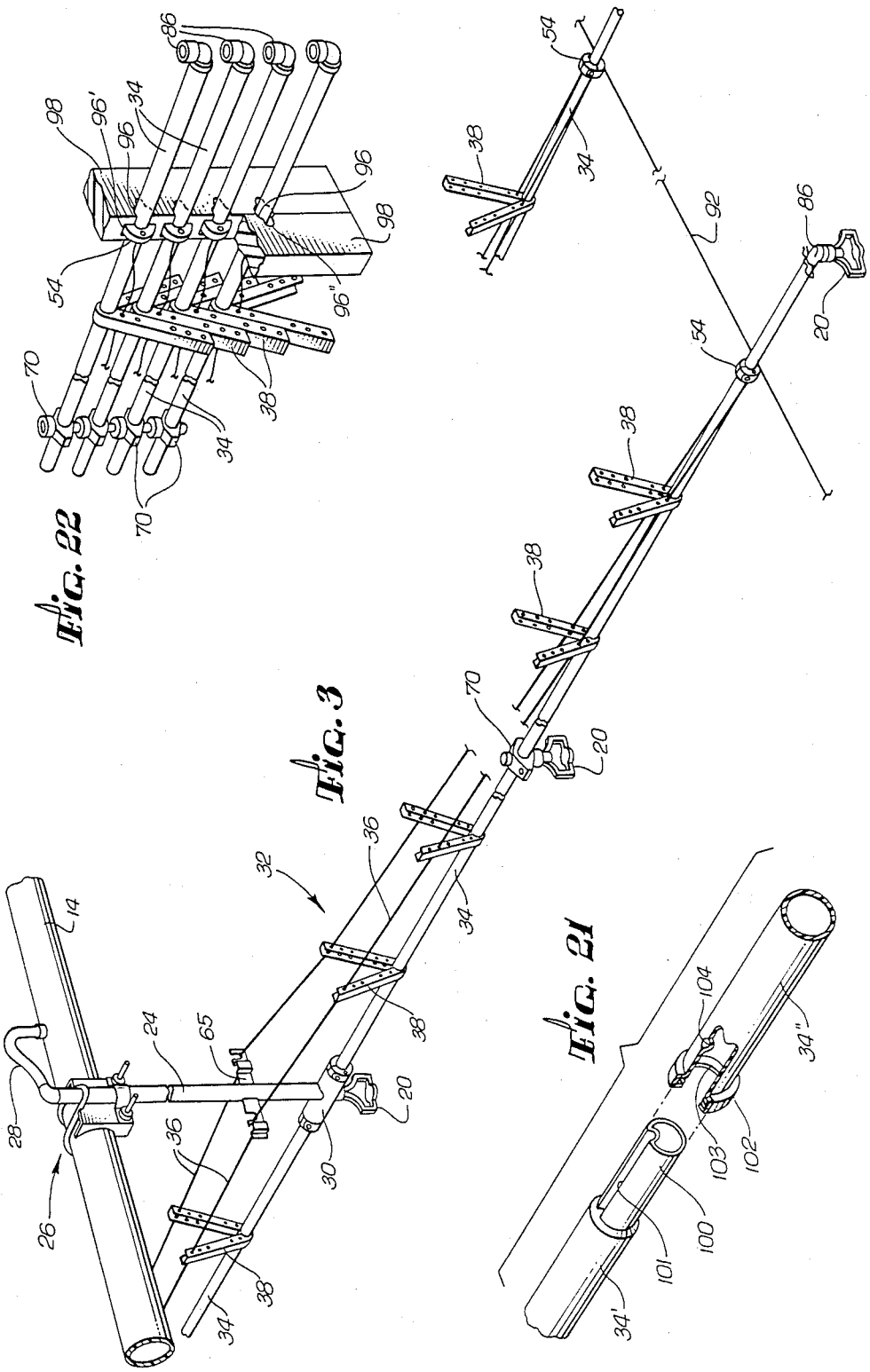

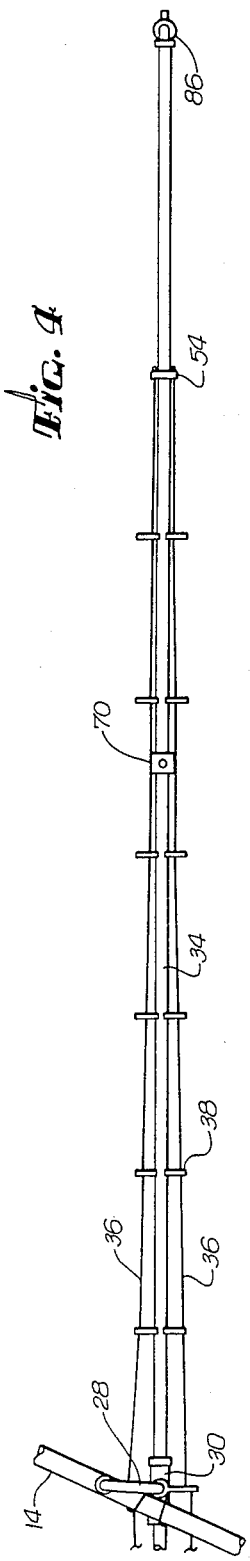
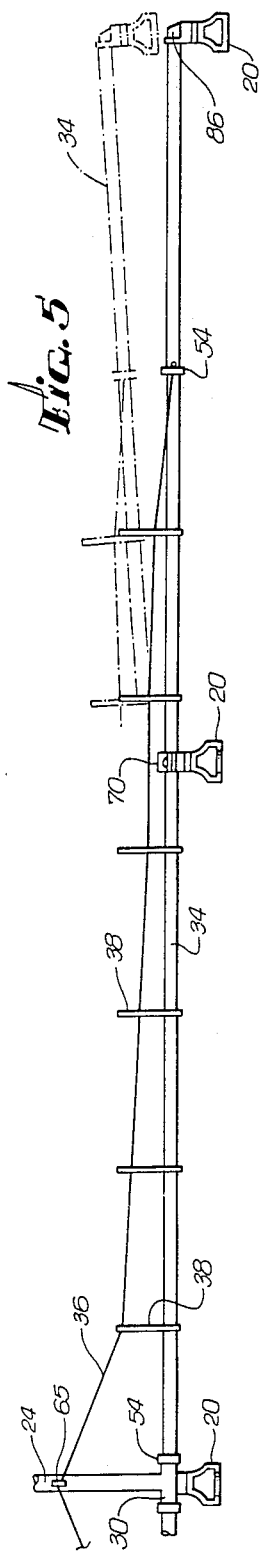
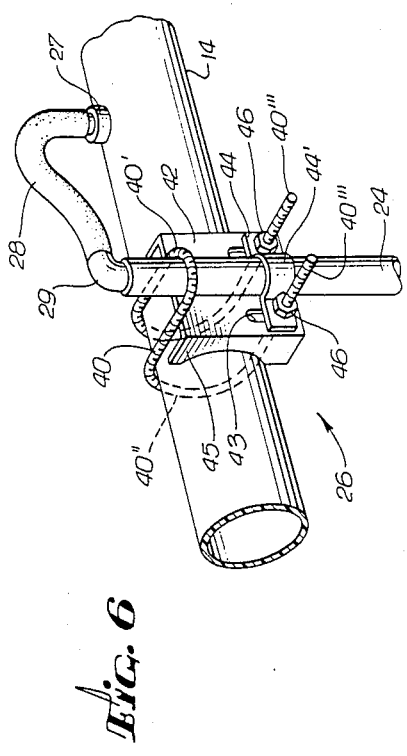
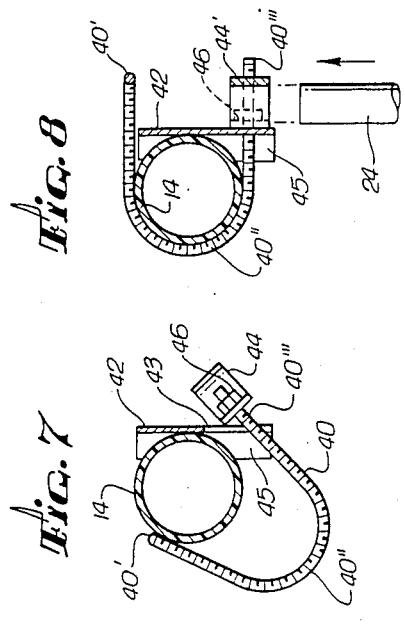
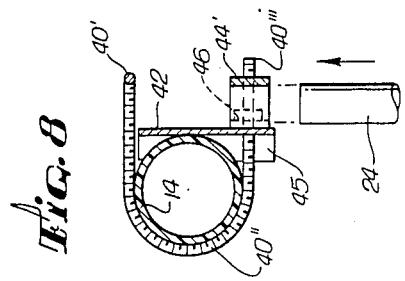

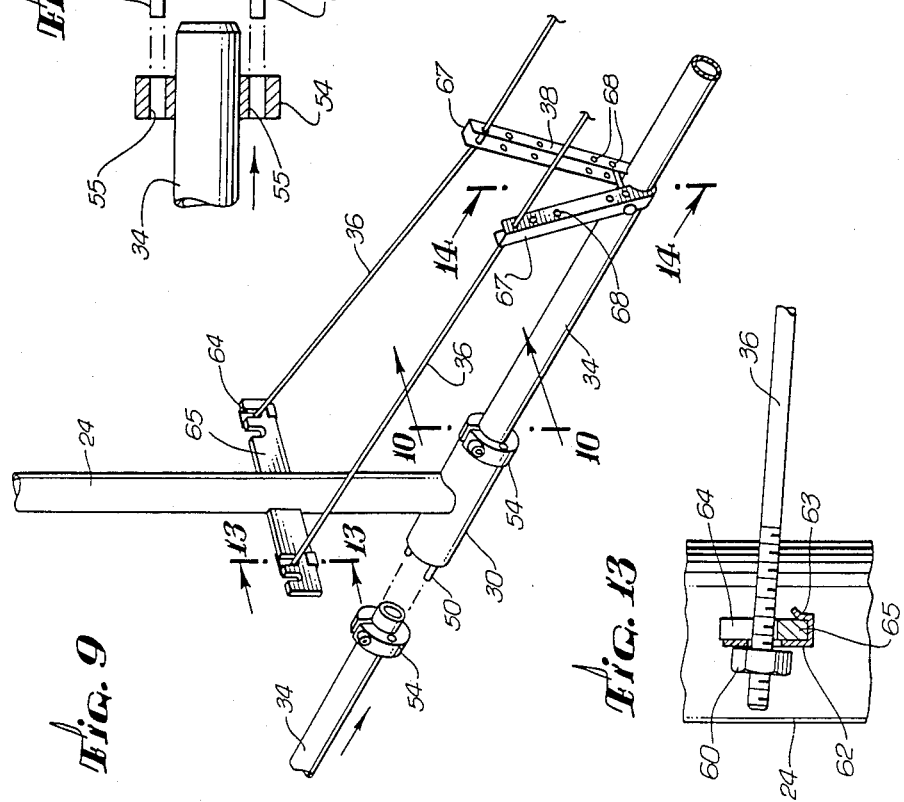
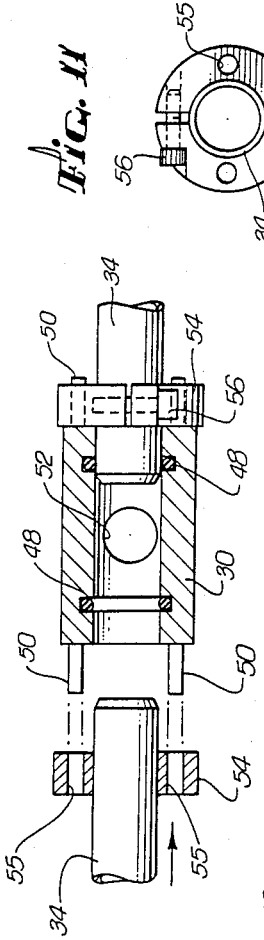
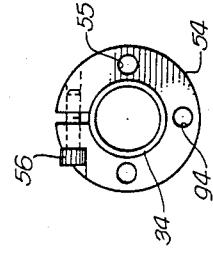
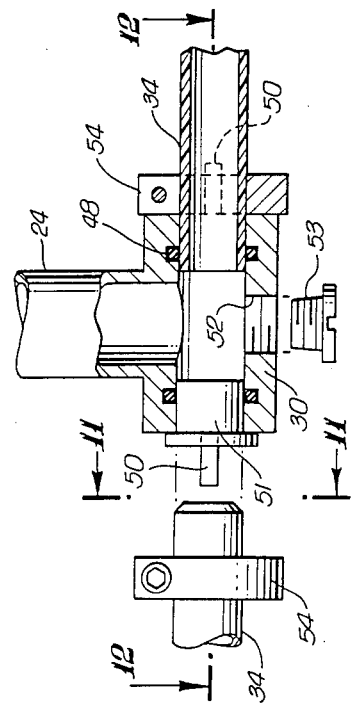
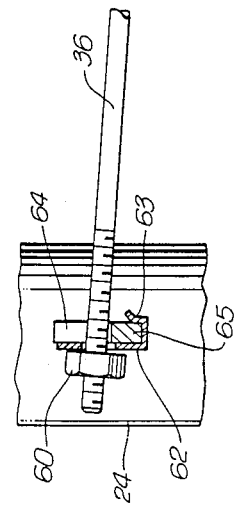

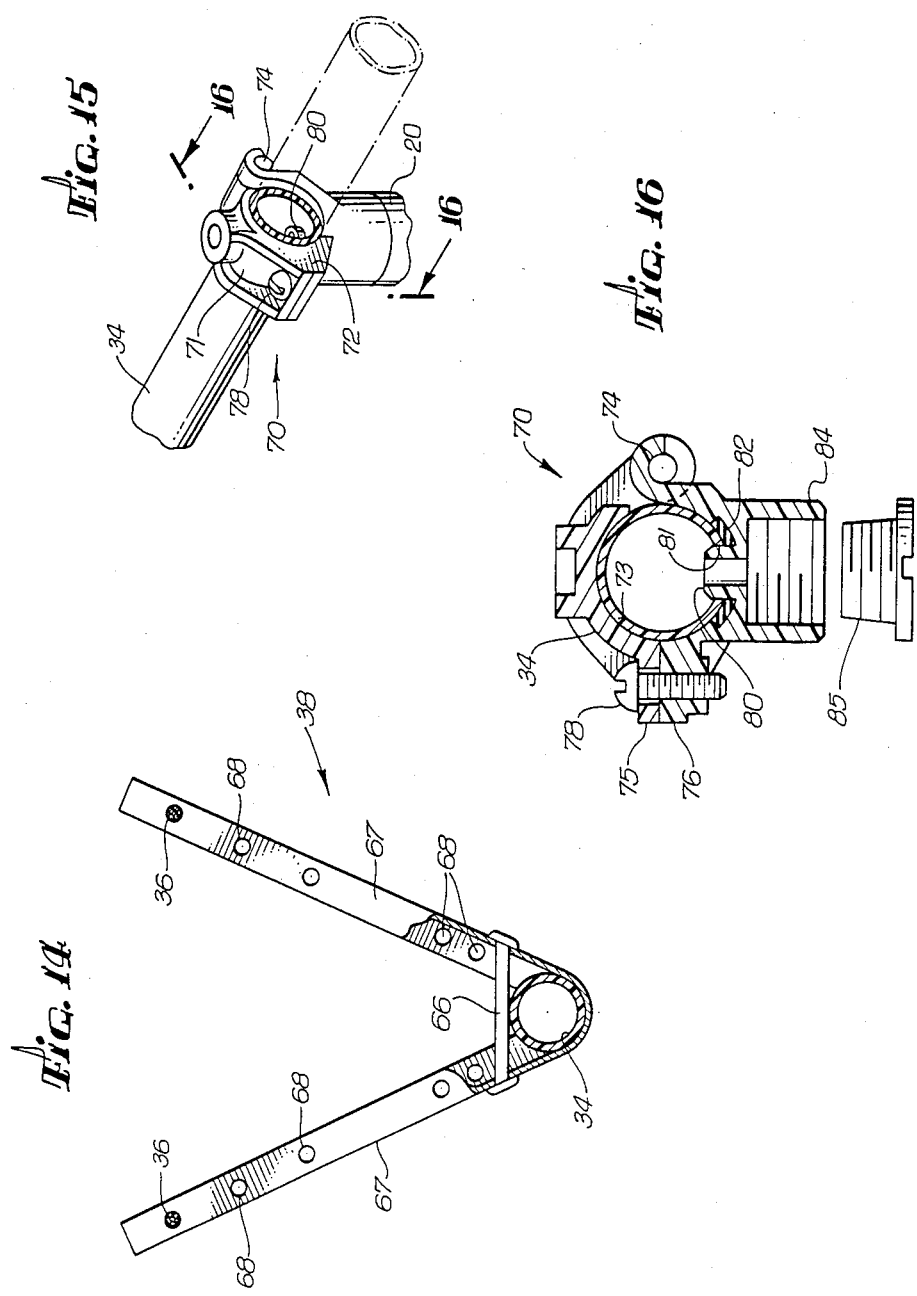

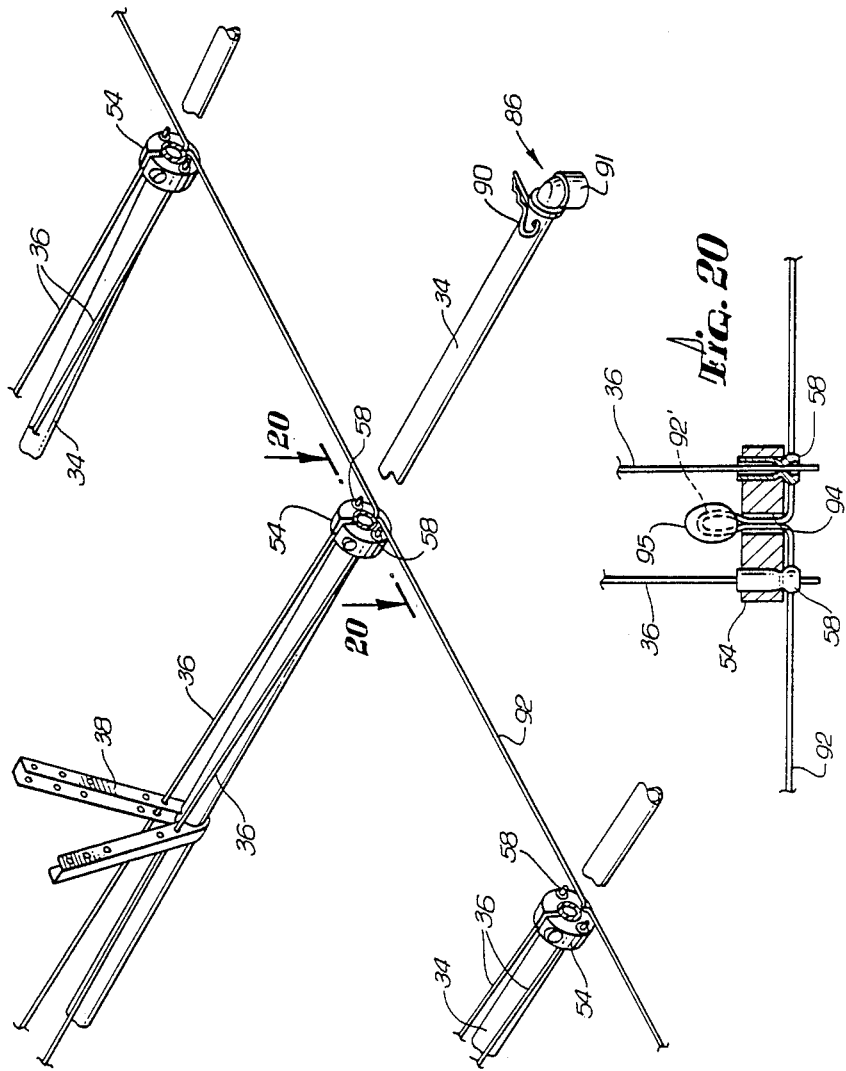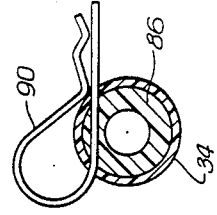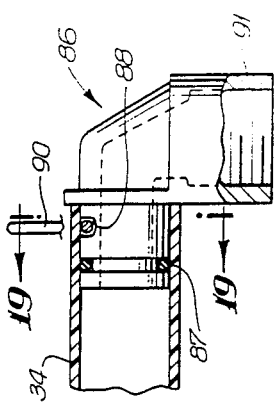

IRRIGATION BOOM ASSEMBLY

This application is a continuation of application Ser. No. 925,308, filed on Oct. 31, 1986, now abandoned, which is a continuation of application Ser. No. 738,373, filed May 28, 1985, now abandoned.

BACKGROUND OF THE INVENTION

This invention relates generally to improvements in traveling irrigation systems particularly of the so-called center pivot or linear travel types used widely for irrigation of large terrain areas, such as required in the irrigation of agricultural crops and the like. More specifically, this invention relates to an improved irrigation boom assembly for mounting onto the main water distribution pipe of a traveling irrigation system, wherein the improved boom assembly comprises a relatively small number of lightweight and easily assembled components which are adaptable to accommodate a wide range of operating requirements.

Travelings irrigation systems have been widely used for supplying irrigation water to large terrain areas, particularly such as irrigation of agricultural crops and the like. In such systems, a plurality of irrigation sprinklers are mounted along the length of an elongated water distribution pipe which is in turn supported by one or more wheeled frames for traveling movement through an agricultural field. In one common form, the distribution pipe is driven through a circular pattern about a so-called center pivot whereby the sprinklers collectively provide irrigation water to a terrain area of circular shape. In another form, the distribution pipe is driven as a linear unit in a direction generally perpendicular to its longitudinal axis to traverse and irrigate a terrain area of generally rectangular shape. In both types of systems, the sprinklers are positioned to irrigate the soil in overlapping patterns and with a water delivery rate chosen to accommodate distribution pipe movement across a field at an acceptable, not unduly slow rate of travel.

While traveling irrigation systems of the type described have advantageously permitted irrigation of large terrain areas, a variety of practical limitations and difficulties have arisen. For example, the quantity of irrigation water which can be delivered to a given portion of the terrain area is limited by the rate of travel of the distribution pipe through the agricultural field. Accordingly, to achieve adequate watering, excessive water flow rates from the sprinklers are sometimes required to result in undesirble water run-off and waste. In some systems, this problem is offset by using sprinklers having an increased range of throw thereby increasing the time period during which irrigation water is delivered to a given portion of the terrain area. This approach thus permits each sprinkler to deliver irrigation water at a somewhat reduced flow rate, but, unfortunately, also requires higher energy water droplets typically of significantly larger size which are known to undesirably compact some types of soil within a relatively short period of time.

In an effort to overcome these and other difficulties, auxiliary boom assemblies have been proposed for mounting onto the water distribution pipe of a traveling irrigation system to spread the instantaneous delivery of irrigation water over a larger coverage area without requiring use of sprinklers having a long range of throw. More particularly, in such proposals, a plurality of boom assemblies are suspended from the distribution pipe to extend in a cantilevered fashion angularly forwardly and rearwardly therefrom in a generally parallel array with each boom assembly including a plurality of relatively small irrigation sprinkler spray heads for irrigating small overlapping terrain patterns. Collectively, the plurality of spray heads on the plurality of boom assemblies substantially increase the overall coverage area for any given point in time to permit relatively low flow and relatively low energy water delivery from each spray head. However, these auxiliary boom assemblies have been relatively complex in construction to include the plurality of spray heads and the required support means for structurally supporting the boom assembly, particularly when its weight is increased by irrigation water flowing to the spray heads. Accordingly, these boom assemblies have generally been constructed from a large number of parts which have required substantial time and labor to assemble and further have not been adapted for compact shipment and/or storage.

There exists, therefore, a significant need for an improved boom assembly for use with a traveling irrigation system, wherein the improved boom assembly provides the requisite structural support means in a lightweight design adapted for quick and easy assembly and further for compact shipment and/or storage. The present invention fulfills these needs and provides further related advantages.

SUMMARY OF THE INVENTION

In accordance with the invention, an improved boom assembly is provided for use with a traveling irrigation system, such as a so-called center pivot or linear travel system or the like. The boom assembly is designed from a relatively small number of lightweight components adapted for easy assembly while providing a substantial span length supported in a secure and stable manner from a main water distribution pipe of the traveling irrigation system. Moreover, the improved boom assembly is adjustable quickly and easily to meet a variety of operating conditions, and is further designed for convenient compact storage and/or shipment when disassembled.

In one preferred form of the invention, the improved boom assembly includes a water supply drop pipe supported near an upper end thereof by a clamp assembly adapted for facilitated connection to the water distribution pipe. The upper end of the drop pipe receives a flow of irrigation water from the distribution pipe via one or more flexible feed hoses, and the lower end of the drop pipe terminates in a manifold of generally inverted T-shaped construction. The manifold supplies water to and supports a lightweight boom consisting of a pair of elongated boom wing tubes having inboard ends seated within the manifold and projecting therefrom in opposite directions to provide a substantial boom span length extending angularly forwardly and rearwardly relative to the distribution pipe. Means are provided for seating the wing tubes within the manifold without overinsertion and without rotation with respect thereto.

The elongated wing tubes have a lightweight construction and each is structurally supported in a cantilevered fashion by a pair of support cables connected between the drop pipe and the wing tube at a position near the outboard end thereof. According to one primary aspect of the invention, these support cables are threaded through selected ones of a plurality of apertures formed in the arms of V-shaped support struts mounted in spaced relation along each wing tube with their arms projecting upwardly therefrom. The cables are threaded through the arm apertures in a manner applying a combination of upward and downward force vectors to the wing tube at spaced points along the wing tube span to support the wing tube in a selected geometry, such as a substantially horizontal orientation relative to the ground when the system is in operation and the wing tube is filled with water. This geometric shape is adjustable by rethreading the support cables through the support strut arms, and the cable lengths are adjustable quickly and easily to vary the elevation of the outboard end of the wing tube relative to the ground or with respect to a crop of the like.

A plurality of irrigation sprinkler spray heads are coupled to each boom assembly at the drop pipe manifold and at selected positions along the length of each wing tube. An end fitting is provided at the outboard end of each wing tube for supporting one of the spray heads, wherein this end fitting is easily removable to permit wing tube flushing. Guy wires can be connected to the wing tubes near their outboard ends and in a simplified manner to control the spacing between adjacent booms. Moreover, the V-shaped configuration of the support struts on the wing tubes permits nested stacking of the wing tubes when disassembled for convenient and compact shipment and/or storage.

Other features and advantages of the present invention will become more apparent from the following detailed description, taken in conjunction with the accompanying drawings, which illustrate, by way of example, the principles of the invention.

BRIEF DESCRIPTION OF THE DRAWINGS

The accompanying drawings illustrate the invention. In such drawings:

FIG. 1 is a fragmented and somewhat schematic perspective view illustrating a traveling irrigation system including a plurality of improved irrigation boom assemblies embodying the novel features of the invention;

FIG. 2 is a diagrammatic plan view illustrating terrain area coverage of the irrigation system of FIG. 1;

FIG. 3 is an enlarged fragmented perspective view of one of the improved irrigation boom assemblies embodying the invention;

FIG. 4 is a fragmented top plan view of the boom assembly shown in FIG. 3;

FIG. 5 is a fragmented side elevation view of the boom assembly shown in FIG. 3;

FIG. 6 is an enlarged fragmented perspective view illustrating a clamp assembly forming a portion of the improved irrigation boom assembly and shown installed onto a main water distribution pipe;

FIG. 7 is a vertical sectional view illustrating an initial step in the installation of the clamp assembly onto the main water distribution pipe;

FIG. 8 is another vertical sectional view illustrating further steps in the installation of the clamp assembly;

FIG. 9 is an enlarged fragmented perspective view similar to a portion of FIG. 6 and shown partially in exploded form to illustrate assembly of elongated boom wings with a water supply drop pipe;

FIG. 10 is an enlarged fragmented vertical sectional view taken generally on the line 10—10 of FIG. 9;

FIG. 11 is a vertical sectional view taken generally on the line 11—11 of FIG. 10;

FIG. 12 is a fragmented horizontal sectional view taken generally on the line 12—12 of FIG. 10;

FIG. 13 is an enlarged fragmented vertical sectional view taken generally on the line 13—13 of FIG. 9;

FIG. 14 is an enlarged vertical sectional view taken generally on the line 14—14 of FIG. 9;

FIG. 15 is an enlarged fragmented perspective view illustrating means for mounting a sprinkler spray head along the span of a boom wing;

FIG. 16 is an enlarged vertical sectional view taken generally on the line 16—16 of FIG. 15;

FIG. 17 is an enlarged fragmented perspective view illustrating structural details of the outboard ends of adjacent boom wings;

FIG. 18 is an enlarged fragmented side elevation view of the outboard end of a boom wing with portions thereof broken away to illustrate installation of an end fitting thereinto;

FIG. 19 is a vertical sectional view taken generally on the line 19—19 of FIG. 18;

FIG. 20 is an enlarged fragmented horizontal sectional view taken generally on the line 20—20 of FIG. 17;

FIG. 21 is an enlarged fragmented exploded perspective view illustrating assembly of a plurality of the boom wings into a compact package for shipment or storage; and FIG. 22 is an enlarged fragmented exploded perspective view illustrating one alternative boom wing construction.

DETAILED DESCRIPTION OF THE PREFERRED EMBODIMENT

As shown in the exemplary drawings, a traveling irrigation system referred to generally by the reference numeral 10 includes a plurality of improved irrigation boom assemblies 12 embodying the novel features of the invention. These boom assemblies 12 are suspended from an elongated main water distribution pipe 14 which is in turn carried by a plurality of wheeled frames 16 for traveling movement, as illustrated by arrows 18 in FIGS. 1 and 2, over a terrain area of substantial size, particularly such as an agricultural field or the like. During such movement, irrigation water flows from the main distribution pipe 14 to each of the improved boom assemblies 12 for delivery to the surrounding terrain from a plurality of irrigation sprinkler spray heads 20.

The main water distribution pipe 14 and the wheeled frames 16 comprise standard components of a conventional traveling irrigation system, whereby only a portion of the pipe 14 supported by two of the wheeled frames 16 is shown in the accompanying drawings. In a typical irrigation system, however, the pipe 14 has a length sufficient to span a substantial terrain width and is normally supported by a larger number of the wheeled frames at regularly spaced intervals. In some irrigation systems referred to normally as center pivot systems, the distribution pipe 14 is adapted for traveling movement on the frames 16 rotationally about one end of the pipe to irrigate a terrain area of generally circular shape. In another type of irrigation system commonly known as a linear travel or wheel line system, the distribution pipe 14 is moved across an agricultural field in a direction generally perpendicular to a longitudinal axis of the pipe to irrigate an area of generally rectangular shape. In either case, one end of the distribution pipe 14 is coupled to a source of irrigation water for delivery to the individual boom assemblies 12 which, as shown best in FIG. 2, are suspended from the distribution pipe 14 in spaced parallel relation to project forwardly and rearwardly therefrom and in oblique relation thereto. The irrigation water is thus discharged from each boom assembly 12 through its associated plurality of spray heads 20 in a plurality of relatively small overlapping patterns 22 (FIG. 2) set obliquely with respect to the axis of the distribution pipe 14. These patterns 22, which advantageously represent relatively low energy and low flow water distribution over a substantial surface area, further overlap the patterns of adjacent boom assemblies as the irrigation system 10 travels through an agricultural field to provide a highly uniform overall distribution of irrigation water.

The improved boom assembly 12 of the present invention advantageously provides a lightweight boom structure adapted for faster and easier installation onto the main water distribution pipe. Each boom assembly 12 includes simplified and easily adjustable support means for elevational orientation in accordance with terrain variation requirements, crop heights, and the like. Moreover, the improved boom assembly is designed for facilitated interconnection with guy wires to reduce wind sway during traveling movement through a field, for facilitated flushing as required to remove accumulated water-entrained grit or debris, and for compact stacking for storage and/or shipment when in a disassembled state.

As shown generally in FIGS. 1-5, each improved boom assembly 12 of the present invention comprises a water supply drop pipe 24 having an upper end secured at a selected position onto the main water distribution pipe 14 by an improved clamp assembly 26. Irrigation water from the pipe 14 is coupled to the upper end of the drop pipe 24 via a relatively short flexible feed hose 28, although multiple feed hoses for each drop tube can be used depending upon flow requirements. The lower end of the drop pipe 24 terminates in a manifold 30 which receives and supports an elongated boom 32 in the form of an oppositely projecting pair of boom wing tubes 34. These wing tubes 34 are structurally supported in predetermined yet easily adjustable orientations by pairs of support cables 36 connected between the drop pipe 24 and the wing tubes near the outboard ends thereof, and threaded in a manner to be described through support struts 38 mounted at spaced positions along the wing tubes. The spray heads 20 are supported by the wing tubes and, if desired, by the manifold 30 for receiving irrigation water supplied to the wing tubes via the water supply drop pipe 24.

More particularly, as shown best in FIGS. 3 and 6-8, the water supply drop pipe 24 comprises a section of metal tubing having a length sufficient to extend from a lower end near the ground to an upper end projecting at least a short distance above the main water distribution pipe 14. The drop pipe 24 is adapted for rapid and adjustable connection to the distribution pipe 14 by means of the improved clamp assembly 26 without requirement for modification of the distribution pipe or permanent mounting of components thereonto. Accordingly, a plurality of drop pipes 24 of a plurality of boom assemblies 12 can be installed onto the distribution pipe 14 of an existing traveling irrigatoon system in a selected number and spacing chosen to suit a particular set of irrigation requirements.

The improved clamp assembly 26 comprises an elongated and preferably continuously threaded cinch rod 40 having a generally U-shaped side profile and doubled back upon itself for secure simultaneous engagement with the distribution pipe 14, a clamp plate 42, a support bracket 44, and the drop pipe 24. More specifically, the illustrative cinch rod 40 is complexly bent to have an upper horizontal loop 40' sized to wrap semi-circularly about the drop pipe 24 and to extend therefrom with two generally parallel spaced legs over the top of the distribution pipe 14. The rod legs then wrap downwardly each with a further semi-circular vertical loop 40" to extend beneath the distribution pipe 14 with a pair of spaced threaded free ends 40''' projecting generally in parallel with the upper loop 40'. These free ends 40''' have a length to extend through a respective pair of vertically elongated slots 43 formed in the clamp plate 42 which has accurately recessed side panels 45 for engaging the distribution pipe 14 on a side generally opposite the vertical rod loops 40". The rod free ends 40''' project further through opposite ends of the pipe support bracket 44 which has a central semicircular loop portion 44' opening toward the clamp plate 42. The upper end of the drop pipe 24 is passed upwardly between the clamp plate 42 and the support bracket loop portion 44' and further upwardly through the upper loop 40' of the cinch rod 40. Nuts 46 are drawn down over the rod free ends 40''' to clamp the rod 40 tightly about the distribution pipe and further to clamp the drop pipe 24 tightly in place.

The clamp assembly 26 is installed quickly and easily, as shown in FIGS. 7 an 8, by initially pivoting the cinch rod 40 within the freedom provided by the clamp plate slots 43, and with the nuts 46 in a loosened condition, to provide an opening between the upper rod loop 40' and the upper end of the clamp plate 42. The clamp assembly can then be displaced upwardly onto the distribution pipe 14 with said pipe passing into the vertical rod loops 40", as viewed in FIG. 7, after which the rod 40 is pivoted within the clamp plate slots 43 to return the upper loop 40' to a position projecting over the top of and beyond the clamp plate 42, as viewed in FIG. 8. While holding the clamp assembly in this position, the upper end of the drop pipe 24 is then easily passed upwardly through the loop portion 44' of the support bracket 44 and further upwardly through the upper rod loop 40'. The nuts 46 are then tightened to draw the upper loop into tight clamping relation with the drop pipe and the vertical loops are drawn into tight clamping relation with one side of the distribution pipe. At the same time, the side panels 45 of the clamp plate 42 are tightly clamped against the opposite side of the pipe 14 and the support bracket 44 is clamped securely against the drop pipe 24.

The above-described clamp assembly advantageously provides a simple structure which is thus oriented easily at a selected position onto the distribution pipe 14 without loose parts and requiring only tightening of the two nuts 46 which are maintained on the rod cinch 40 throughout the mounting procedure. The preferred continuously threaded nature of the rod 40 provides a multitude of sharp gripping surfaces to provide the desired secured clamping without concern for inadvertent shifting during use, although other rod or rodlike configurations and/or gripping surfaces of different configurations can be used as desired. Moreover, the clamp assembly is adaptable for a wide range of conditions in that the drop pipe 24 can be installed anywhere along the distribution pipe 14. The drop pipe can be supported vertically or in a near vertical condition by controlling the rotational position of the clamp assembly about the distribution pipe, and the drop pipe can be adjusted vertically along or rotated about its axis within the clamp assembly to control the height and the angular setting of the boom 32, as will be described in more detail.

Irrigation water is supplied from the distribution pipe 14 to the upper end of the drop pipe 24 by the flexible feed hose 28 which can be of any convenient known construction. In the exemplary drawings, this feed hose 28 has one end coupled to the distribution pipe 14 by a suitable fitting 27 and an opposite end coupled to the drop pipe 24 and another suitable fitting 29, with the flexible nature of the feed hose 28 accommodating required positional adjustments of the drop pipe.

The irrigation water flows downwardly through the hollow drop pipe 24 to the manifold 30 which has an inverted generally T-shaped tubular construction for dividing the water flow to the oppositely extending wing tubes 34 forming the boom 32. More particularly, with reference to FIGS. 3 and 8–12, the manifold 30 terminates in a pair of oppositely opening outlets each having an internally seated seal ring 48 and an external pair of axially outwardly projecting lock pins 50. A dust plug 51 (FIG. 10) is temporarily seated within each outlet during shipment and/or storage but is quickly and easily removable at the time of assembly to permit insertion of the inboard ends of the associated wing tube 34. In addition, the manifold 30 can include a downwardly opening threaded bore 52 for mounting one of the spray heads 20, as will be described, with a threaded lug 53 being provided to prevent entry of dust and grit and further to close the bore 52 when a spray head at that position is not required.

The wing tubes 34 are generally of identical construction and comprise hollow elongated tubes of a lightweight material, such as aluminum or the like, although other materials, such as thin-walled stainless steel may be desirable in some environments, such as when relatively corrosive water is used. The lengths of the wing tubes 34 may vary as required, with individual lengths on the order of twenty-five feet being contemplated to provide an overall boom span of about fifty feet.

As shown in FIGS. 9–12, the wing tubes 34 each have an inboard end having a chamfer or the like for facilitated insertion into one of the outlets of the associated manifold 30. The internal seal ring 48 within the manifold engages the wing tube to confine flow of irrigation water from the drop pipe 24 without significant leakage to the exterior of the wing tubes 34 inserted into the manifold. Enlarged collars 54 are secured near the inboard ends of the wing tubes 34 to provide stops preventing wing tube overinsertion into the manifold outlets, and these collars 54 advantageously include a pair of axially open ports 55 which receive the lock pins 50 to prevent wing tube rotation or twisting within the manifold outlets. For ease of construction and assembly, these collars preferably comprise split ring friction collars each having a clamp screw 56 for locking the collar in the selected position.

The two wing tubes 34 of each boom assembly 12 are structurally suspended from the drop pipe 24 by the respective pairs of the support cables connected between the drop tube and the wing tubes near their outboard ends, as shown in FIGS. 3, 9, 13, 14, 17. More specifically, as shown best in FIGS. 3 and 17, each wing tube 34 has an additional enlarged collar 54 locked thereonto near but spaced a short distance from the tube outboard end. The axially open ports 55 of this outboard collar 54 receive the outboard ends of the associated pair of support cables 36, wherein these outboard ends are locked against withdrawal from the ports 55 as by a respective pair of cable stops 58 secured as by crimping or the like onto the outboard cable ends and including enlarged outboard flanges or ball ends for engaging the outboard face of the collar 54.

From the collar 54, the pair of cables extend in an inboard direction above the associated wing tube 34 for adjustable and releasable connection to the drop tube 34. As shown best in FIGS. 3, 9, and 13, this connection is achieved in the preferred form securing nuts 60 onto threaded inboard ends of the cables 36 together with a generally L-shaped locking clip 62 including a short lower locking toe 63 angled upwardly from the clip lower end. The cabels 36 are seated near their inboard ends into upwardly open slots 64 in a pair of oppositely projecting anchor arms 65 secured as by welding or the like onto the drop pipe 24 in spaced relation above the manifold 30. The locking clips 62 each serve as a retainer engaging the back and lower sides of the associated anchor arm 65 while the locking toe 63 releasably secures the clip with the anchor arm to prevent accidental removal of the cable from the arm slot 64.

The two wing tubes 34 forming each boom 32 are thus cantilevered from the associated drop pipe 24. The wing tubes 34 are assembled with the drop pipe quickly and easily by simple insertion of the inboard ends into the manifold 30 and placement of the pairs of support cables 36 by engaging the locking clips 62 with the drop tube anchor arm 65. The cables 36 support the outboard ends of the wing tubes above the ground with simplified adjustment to desired height by rotating the cable nuts 60 to vary the effective cable lengths. The cantilevered nature of the support places the cables under tension and the wing tubes under compression resulting in a component of force acting in an inboard direction upon each wing tube to prevent dislodging of the wing tubes from the manifold. Moreover, each pair of cables is laterally spaced to provide lateral stability to the cantilevered wing tube. However, the combined wing tube and its support cables present a substantially minimal profile to reduce sway effects from wind and the like and further to reduce accumulation of sleet or snow during adverse weather conditions.

In accordance with one primary aspect of the invention, the support cables 36 for each wing tube 34 are threaded through a plurality of the support struts 38 in a manner permitting close and variable control over the geometric shape of the wing tube without requiring heavy, rigid, or complex support structures. These support struts 38, as shown best in FIGS. 3, 9, 14, and 17, are installed at longitudinally spaced positions along the length of the associated wing tube between the outboard friction collar 54 and the drop pipe 24. Each support strut 38 is formed from a lightweight material, such as aluminum, having preferably a channeled cross section and bent to a generally V-shaped configuration. The strut 38 is secured onto the wing tube 34 by means of a rivet 66 (FIG. 14) or the like fastened between the upwardly projecting diverging arms 67 of the strut in a position slightly above the strut apex to securely clamp the wing tube generally within said apex. Conveniently, the channeled cross section of the strut provides relatively sharp surfaces for gripping securely with the wing tube.

Each V-shaped strut 38 has a plurality of axially open apertures 68 formed through its arm 67. These apertures are formed in a predetermined array and the support cables 36 for each wing tube are threaded through selected apertures for each strut to control the geometric shape of the wing tube which is otherwise of insufficient strength to support its own weight when cantilevered from the drop pipe 24, especially during operation with the added weight of water within the wing tube. More particularly, as shown best in FIGS. 4 and 5, the cables 36 are threaded through the strut apertures in a manner providing vertically oriented force vectors such as a combination of upward and downward force vectors acting upon the cantilevered wing tube to support the wing tube in a preselected geometry, typically such as a nearly linear shape when filled with water as viewed in solid lines in FIG. 5. For example, to achieve this or any other selected configuration for the cantilevered wing tubes, the cables 36 can be threaded through the support struts 38 to deviate downwardly from an undisturbed cable configuration at some struts and/or to deviate upwardly from an undisturbed cable configuration at other struts, thereby respectively providing a longitudinally staggered combination of generally vertically oriented forces of individually selected magnitude and direction applied to the wing tube. Conveniently, the selected wing tube shape can be altered whenever required by rethreading of the cables or adjusting the nuts 60 without requiring alternate wing tube support components, thereby permitting alternate shapes, such as an inclined configuration as depicted in dotted lines in FIG. 5. In addition, the provision of two laterally separated support cables 36 and the V-shaped configuration for the support struts 38 for each wing tube also contributes to improved lateral stability.

The spray heads 20 are mounted at selected positions along the length of each wing tube 34 to provide each boom 32 with a plurality of the sprinkler heads. As previously described, one of the sprinkler heads can be mounted at the manifold 30 on the lower end of the drop pipe 24 by simple rotation of a threaded base into the threaded manifold bore 52. One or more additional spray heads 20 can be installed intermediate the length of each wing tube 34. In addition, a sprinkler head 20 can be installed at the outboard end of each wing tube.

A relatively simple clamp fixture 70 is provided for facilitated mounting of a spray head 20 intermediate the length of a wing tube 34, as shown best in FIGS. 15 and 16. This clamp fixture 70 comprises a pair of clamp halves 71 and 72 cooperatively defining an axial passage 73 for the wing tube 34. These clamp halves 71 and 72 include snap-fit interfitting arm at one side of the passage 73 forming a hinge 74 permitting fixture opening and placement onto the wing tube. The opposite sides of the clamp halves include aligned tabs 75 and 76 for receiving a screw 78 to lock the clamp halves onto the wing tube. A nipple 80 on the lower clamp half 72 projects partially into an opening 81 formed in the wing tube in any suitable manner, with a seal gasket 82 surrounding the nipple to confine water flow to downward passage through the nipple to a threaded boss 84. One of the spray heads 20 which may have any convenient design is adapted for mounting onto this threaded boss. Alternately a dust plug 85 (FIG. 17) can be secured into the threaded boss if removal of the spray head later becomes desirable.

As shown in FIG. 17–19, an end fitting 86 is removably mounted at the outboard end of each wing tube to provide a convenient mounting fixture for a spray head 20 at that location. This end fitting comprises a generally elbow-shaped component of molded plastic or the like having an inlet end sized for sliding reception into the outboard end of the wing tube 34. An external groove in the inlet end supports a seal ring 87 to prevent water leakage, and an external transverse notch 88 permits passage of one leg of a cotter pin 90 through aligned holes formed in the wing tube near its outboard end and offset from a central axis of the wing tube to lock the end fitting in place. The end fitting protrudes from the wing tube to include a downwardly opening threaded boss 91 for connection of one of the spray heads 20, with the cotter pin 90 conveniently located outside a water flow path through the end fitting to avoid interfering with spray head operation. Alternately, an appropriate dust plug (not shown) can be threaded into the boss 91 if no spray head is desired at that location. In either event, the end fitting 86 is removable quickly and easily from the wing tube without requiring use of tools to permit periodic flushing of debris or other accumulated matter from the wing tube.

The plurality of boom assemblies 12 constructed as described above are installed along the length of the main distribution pipe 14 in spaced, generally parallel relation as viewed in FIGS. 1 and 2. The booms 32 of each boom assembly are obliquely oriented relative to the distribution pipe so that the water spray patterns 22 of the various spray heads overlap spray patterns of heads on adjacent boom assemblies to provide widespread and uniform water distribution.

Guy wires 92 are conveniently interconnected between the wing tubes 34 of the various boom assemblies 12 to maintain the relative positions thereof without significant sway or wind drift as the irrigation system 10 moves across a field. In this regard, the improved boom assemblies 10 provide simplified means for stringing the guy wire between adjacent boom assemblies. More particularly, as shown in FIGS. 17 and 20 the outboard friction collars 54 on each wing tube 34 include an additional axially open port 94 through which a small loop 92' of the guy wire 92 can be inserted quickly and easily. This loop 92' is secured by a small piece of deformable split shot 95 of lead or the like crimped onto the loop and having a size to prevent passage back through the collar port 94. The guy wire is thus secured with respect to the wing tube and can be similarly secured in a rapid procedure to adjacent wing tubes to string together adjacent boom assemblies.

The improved boom assembly 12 of the present invention thus provides a relatively simple and lightweight structure adapted for facilitated mounting onto and use with the main distribution pipe 14 of a traveling irrigation system 10. Structural support for the boom assemblies is relatively simple in design and easily assembled while providing high adaptability to alter the supported shape of the boom assemblies as desired. Moreover, as shown in FIG. 21, the individual wing tubes 34 for a group of the boom assemblies are adapted for convenient nested stacking for compact and stable stacked storage and/or shipment with the struts 38 and the spray head clamp fixtures in nesting relation, and with the wing tubes 34 conveniently supported in closely spaced relation by cooperatively formed openings 96 in facing pairs of stacking blocks 98. For improved stacking stability, these openings 96 include central enlargements 96' for encapsulated seating of the collars 54, and further including lateral extensions 96'' to accommodate passage of the cables 76.

Various modifications to the preferred form of the improved boom assembly as described are believed to be apparent without departing from the spirit and scope of the invention. For example, as shown in FIG. 22, each wing tube can be formed from two or more shorter sections, such as the illustrated sections 34' and 34", wherein these sections are adapted for rapid end-to-end assembly by means of a necked-down insert end 100 having a longitudinal groove 101 on the end of the section 34' for nonrotational insertion into the adjacent receptacle end of the section 34" having a raised bead 102 with a captured seal ring 103 and a dimple 104 for tracking into the groove 101. Alternatively, the support cables 36 can be modified to extend continuously between the outboard ends of a pair of installed wing tubes, with appropriate means for seating a central cable region within the anchor arm 65 and threaded nuts at the cable outboard ends for adjustment purposes. Other modifications of a simliar nature are believed to be possible. Accordingly, no limitation on the invention is intended by way of the description herein, except as set forth in the appended claims.

What is claimed is:

1. An irrigation boom assembly for use with a traveling irrigation system having a main water distribution pipe, said boom assembly comprising:
   a drop pipe;
   means for mounting said drop pipe on the distribution pipe in a generally vertical orientation;
   means for coupling irrigation water from the distribution pipe to said drop pipe;
   an elongated boom including a pair of elongated wing tubes adapted to carry a plurality of irrigation sprinkler spray heads, said wing tubes each having inboard and outboard ends;
   means for mounting said inboard ends of said wing tubes to said drop pipe in flow communication therewith and with said wing tubes projecting outwardly generally in opposite directions from said drop pipe, said mounting means comprising an inverted, generally T-shaped manifold at the lower end of said drop pipe and defining a pair of oppositely opening outlets, said wing tubes having their inboard ends sized for seat reception into said outlets, and further including at least one lock pin respectively adjacent each of said manifold outlets and projecting outwardly therefrom, each of said wing tubes having means forming an open port for reception of the adjacent lock pin when said wing tubes are seated within said manifold outlets;
   cable means coupled between said drop pipe and said wing tubes at coupling sites thereon generally adjacent the outboard ends thereof to support said wing tubes in cantilevered relation from said drop pipe, said cable means retaining the inboard ends of said wing tubes seated within said manifold outlets; and
   a plurality of support struts mounted at spaced positions along the length of each of said wing tubes between said drop pipe and the coupling site of said cable means generally adjacent said wing tube outboard end, said support struts being connected between said associated one of said wing tubes and said cable means and having individually selected lengths for reacting between the associated one of said wing tubes and said cable means to apply a combination of upward and downward force vectors along the lengths of said wing tubes to control the supported geometric shapes of said wing tubes.

2. The irrigation boom assembly of claim 1 including seal means for sealing engagement between said manifold and the exterior of said wing tube inboard ends when said inboard ends are seated within said manifold outlets.

3. The irrigation boom assembly of claim 1 wherein each of said wing tubes has an enlarged collar thereon near the inboard end thereof, said collar defining a stop to prevent overinsertion of said wing tube into the respective one of said manifold outlets.

4. The irrigation boom assembly of claim 3 wherein said manifold further includes a pair of said outwardly projecting lock pins adjacent each of said manifold outlets, said collar on each of said wing tubes having a pair of axially oriented ports for aligned reception of said lock pins to prevent rotation of said wing tube about its longitudinal axis when seated within said respective manifold outlet.

5. The irrigation boom assembly of claim 3 wherein said collar comprises a split ring friction collar removably mounted on said wing tube.

6. The irrigation boom assembly of claim 1 further including at least one anchor arm projecting laterally outwardly from said drop pipe, said cable means comprising at least one cable associated respectively with each of said wing tubes with each of said cables coupled respectively near the outboard end of the associated wing tube and respectively to said at least one anchor arm, each of said cables having an inboard end carrying a generally L-shaped locking clip for releasable locking engagement with said anchor arm.

7. The irrigation boom assembly of claim 6 wherein the lengths of said cables are adjustable.

8. The irrigation boom assembly of claim 6 further including an enlarged split ring friction collar near the outboard end of each of said wing tubes, said collar having at least one axially open port formed therein for passage of said cable associated with said wing tube.

9. The irrigation boom assembly of claim 8 wherein the outboard ends of said cables carry stops with enlarged flanges thereon in outboard positions relative to the associaed one of said enlarged collars for securing said cables with respect thereto.

10. The irrigation boom assembly of claim 8 further including a pair of guy wires associated respectively with each of said wing tubes, said enlarged collars at the outboard ends of each wing tube having an additional open port formed therein for reception therethrough of a loop of the associated one of said guy wires, and further including means for retaining said guy wire loop within said additional open port.

11. The irrigation boom assembly of claim 10 wherein said guy wire loop retaining means comprises deformable split shot.

12. The irrigation boom assembly of claim 1 further including a pair of end fittings removably mounted respectively at the outboard ends of said wing tubes, each of said end fittings including means for mounting a respective one of said spray heads in communication with irrigation water within said wing tubes.

13. The irrigation boom assembly of claim 12 wherein each of said end fittings includes an insert portion for insertion into the respective one of said wing tubes, said insert portion having an external transverse notch formed therein and movable to a position in alignment with a pair of transverse openings formed in said wing tube near the outboard end thereof and offset relative to a central axis of said wing tube, and further including lock pin means removably receivable through said wing tube transverse openings for passage through said insert portion notch to lock said end fitting insert portion within said wing tube.

14. The irrigation boom assembly of claim 12 wherein said end fitting is generally elbow-shaped.

15. The irrigation boom assembly of claim 1 wherein each of said support struts has a generally V-shaped configuration including a pair of arms projecting generally upwardly and laterally outwardly from the associated wing tube, each of said arms having a plurality of apertures formed therein, said cable means comprising pairs of cables associated respectively with said wing tubes with each pair of cables threaded through selected ones of said apertures in said support strut arms associated with the respective one of said wing tubes.

16. The irrigation boom assembly of boom 15 wherein each of said support struts has a generally channel-shaped cross section having an apex portion shaped to wrap about and opening generally toward the associated wing tube.

17. The irrigation boom assembly of claim 15 further including a pair of anchor arms projecting in opposite directions laterally outwardly from said drop pipe and oriented generally perpendicularly to said drop pipe and said boom, said anchor arms having a plurality of upwardly open slots formed therein, said pairs of cables having inboard ends seated within said slots and including means for removably retaining said cable inboard ends seated within said slots.

18. The irrigation boom assembly of claim 17 wherein said cable retaining means comprises a plurality of generally L-shaped locking clips mounted respectively onto the inboard ends of said cables, said locking clips each having a lower toe for engagement beneath the associated one of said anchor arms when said associated cable is seated within one of said slots.

19. The irrigation boom assembly of claim 15 wherein each of said support struts has an open generally V-shaped configuration, and further including means for stacking said wing tubes when disassembled from said manifold with said support struts on said wing tubes in nested relation.

20. The irrigation boom assembly of claim 1 wherein at least one of said wing tubes comprises at least two interfitting wing tube sections having means for preventing relative rotation therebetween when said tube sections are connected together.

21. The irrigation boom assembly of claim 1 wherein said drop pipe mounting means comprises a clamp assembly including elongated cinch rod means for connection to said distribution pipe, said cinch rod means having a generally U-shaped profile and doubled back upon itself to define an upper loop and to extend therefrom with two spaced generally parallel rod legs through a pair of central loops oriented generally perpendicular to said upper loop and terminating in free leg ends extending generally in parallel with said upper loop, said clamp assembly further including a clamp plate having a pair of elongated slots oriented generally in parallel with said central loops for reception of said free leg ends of said rod means, a support bracket having free leg ends received through opposite ends thereof and disposed on a side of said clamp plate opposite said rod central loops, and a pair of nuts threaded onto said leg free ends;

said clamp assembly being receivable about the main distribution pipe with the distribution pipe disposed between said central loops of said cinch rod means and said clamp plate, said drop pipe being receivable between said support bracket and said clamp plate and further through said upper loop of said cinch rod means, and said nuts being for drawing up on said leg free ends of said cinch rod means to secure said clamp assembly tightly about the distribution pipe and said drop pipe.

22. The irrigation boom assembly of claim 21 wherein said cinch rod means comprises a rigid rod threaded for substantially its entire length.

23. The irrigation boom assembly of claim 21 wherein said clamp plate includes arcuately recessed side panels presented generally toward said central loops.

24. The irrigation boom assembly of claim 1 wherein said irrigation water coupling means comprises at least one flexible feed hose coupled between the water distribution pipe and said drop pipe.

25. An irrigation boom assembly for use with a traveling irrigation system having a main water distribution pipe, said boom assembly comprising:

a drop pipe having a manifold at one end thereof with a generally T-shaped configuration defining a pair of manifold outlets opening generally in opposite directions, said drop pipe further including a pair of anchor arms projecting in opposite directions outwardly therefrom at a position spaced from said manifold and oriented generally perpendicular to said manifold outlets;

means for mounting said drop pipe on the distribution pipe in a generally vertical orientation with said anchor arms disposed above said manifold and with said manifold outlets oriented obliquely relative to a longitudinal axis of the distribution pipe;

a boom including a pair of elongated and relatively lightweight wing tubes adapted to carry irrigation sprinkler members, said wing tubes having inboard ends respectively slidably seated within said pair of manifold outlets;

a plurality of support struts mounted along the lengths of said wing tubes with each of said wing tubes having at least one of said support struts mounted thereon and projecting generally upwardly therefrom; and a plurality of support cables each connected between a respective one of said wing tubes and its associated at least one support strut, each of said wing tubes being associated with at least one of said cables, for supporting said wing tubes in cantilevered relation from said drop pipe;

each of said cables having an inboard end for removable seating within a respective one of a plurality of upwardly open slots formed within said anchor arms, and further including means at the inboard end of each of said cables for releasably locking said cables within their respective anchor arm slots, said releasable locking means for each of said cables comprising a generally L-shaped locking clip for engaging beneath the associated anchor arm.

26. The irrigation boom assembly of claim 25 wherein at least some of said support struts include means for adjustably reacting between the associated cable and wing tube to apply a force vector of selected magnitude and direction to said associated wing tube thereby controlling the cantilevered geometry thereof.

27. An irrigation boom assembly for use with a traveling irrigation system having a main water distribution pipe, said boom assembly comprising:

a drop pipe having a manifold at one end thereof with a generally T-shaped configuration defining a pair of manifold outlets opening generally in opposite directions, said drop pipe further including a pair of anchor arms projecting in opposite directions outwardly therefrom at a position spaced from said manifold and oriented generally perpendicular to said manifold outlets;

means for mounting said drop pipe on the distribution pipe in a generally vertical orientation with said anchor arms disposed above said manifold and with said manifold outlets oriented obliquely relative to a longitudinal axis of the distribution pipe;

a boom including a pair of elongated and relatively lightweight wing tubes adapted to carry irrigation sprinkler members, said wing tubes having inboard ends respectively slidably seated within said pair of manifold outlets;

means for preventing rotation of said wing tubes respectively about their longitudinal axes when said wing tube inboard ends are seated within said manifold outlets;

a plurality of generally open V-shaped support struts each having an apex portion for mounting to one of said wing tubes and a pair of upwardly and laterally outwardly projecting arms, a plurality of said support struts being mounted in spaced relation along the span of each of said wing tubes, and at least some of said struts associated with each of said wing tubes having a plurality of vertically spaced apertures formed in their arms;

two pairs of support cables associated respectively with said pair of wing tubes, each of said pairs of support cables having inboard ends connected respectively to said drop pipe anchor arms and outboard ends connected to the associated one of said wing tubes generally adjacent the outboard end thereof, each of said pairs of support cables being threaded respectively through selected apertures formed in said support strut arms along opposite lateral sides of the associated one of said wing tubes to selectively deform said cables to apply a combination of vertically oriented force vectors of selected magnitude and direction to said wing tube to control the cantilevered geometry thereof, said pair of support cables further serving to retain the inboard ends of said wing tubes respectively seated within said pair of manifold outlets.

28. The irrigation boom assembly of claim 27 wherein the lengths of said cables are adjustable.

29. The irrigation boom assembly of claim 27 further including a pair of end fittings removably mounted respectively at the outboard ends of said wing tubes.

30. An irrigation boom assembly for use with a traveling irrigation system having a main water distribution pipe, said boom assembly comprising:
an elongated boom including at least one wing tube adapted to carry at least one irrigation sprinkler member;
a manifold having at least one manifold outlet for slidably receiving one end of said at least one wing tube;
means for coupling irrigation water from the main water distribution pipe to said manifold; and
support means for supporting said at least one wing tube with a component of force acting in a direction generally along said wing tube and toward said manifold to retain said one end of said wing tube seated within said manifold, said support means comprising a support structure generally above said manifold and at least one support cable connected between said support structure and said wing tube at a position spaced from said manifold when said wing tube one end is seated within said manifold.

31. An irrigation boom assembly, comprising:
an elongated boom including at least one wing tube adapted to carry at least one irrigation sprinkler member;
support means for supporting an inboard end of said wing tube, said wing tube projecting outwardly from said support means;
anchor means on said support means at a position spaced from the inboard end of said wing tube when said wing tube inboard end is supported by said support means; and
cable means connected between said anchor means and said wing tube at a connection site on said wing tube spaced from said support means for supporting said wing tube generally in cantilevered relation to said support means;
said anchor means defining an anchor arm with an upwardly open slot formed therein, and said cable means including at least one cable having an inboard end carrying a generally L-shaped locking clip for seated reception into said slot and for engaging beneath said anchor arm.

32. The irrigation boom assembly of claim 30 wherein said locking clip has a lower toe for engagement beneath said anchor arm when the inboard end of said cable is seated within said slot.

* * * * *